UNITED STATES PATENT OFFICE.

SAMUEL PEACOCK, OF PHILADELPHIA, PENNSYLVANIA, ASSIGNOR TO BRIDGEWATER CHEMICAL COMPANY, OF PHILADELPHIA, PENNSYLVANIA, A CORPORATION OF DELAWARE.

PROCESS OF EXTRACTING MAGNESIUM COMPOUNDS FROM MAGNESIUM-BEARING ROCKS.

1,250,216.     Specification of Letters Patent.     Patented Dec. 18, 1917.

No Drawing.     Application filed November 28, 1916. Serial No. 133,900.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Extracting Magnesium Compounds from Magnesium-Bearing Rocks; and I do hereby declare the following to be a full, clear, and exact description of the invention, such as will enable others skilled in the art to which it appertains to make and use the same.

This invention relates to a process of extracting magnesium compounds from naturally occurring magnesium silicates and has for its object to obtain said compounds in a manner more expeditious and less costly than has been heretofore proposed.

With these objects in view the invention consists in the novel combinations of steps constituting the invention all as will be more fully hereinafter disclosed and particularly pointed out in the claims.

In carrying out this invention I prepare a suitable charge of a finely ground naturally occurring magnesium silicate, such for example, as a talc or a serpentine, and add thereto a solution of a reagent or compound containing an acid radical capable of forming a water soluble compound with the magnesium radical present. Suitable solutions to be added to the ground rock are those containing calcium chlorid, $CaCl_2$, or ferrous sulfate $FeSO_4$, or ferric sulfate $Fe_2(SO_4)_3$. I next digest the mixed solution and rock materials in a suitable autoclave until the desired magnesium compound has been obtained.

As an example of carrying out this process, I may finely grind serpentine rock to say 100 mesh and digest the same with a water solution containing calcium chlorid in excess of the proportions indicated in the following equation:—

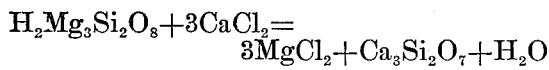

The reactions indicated in this equation while indicating the general nature of the invention, yet do not portray with exactness the real process, for it is found in practice that in order to secure an efficient extraction of the contained magnesium, it is necessary to use say 15% to 20% of calcium chlorid in excess of that theoretically required.

I have found that a simple digestion at a boiling temperature and at atmospheric pressure for say two or three hours will convert from 90% to 95% of the total magnesium present into the form of the chlorid, and of course, if a higher pressure is employed the time required is shortened.

For example, if a pressure of say from 80 to 90 pounds is employed in the autoclave the reaction will not only take place very much more rapidly, but it will continue to almost a complete conversion of the magnesium present.

After the digestion is completed, the insoluble constituent of the charge may be filtered out in any suitable manner and the resulting soluble filtrate consisting of the magnesium chlorid is recovered, and may be used for many well known commercial applications, or it may be refined by any of a number of well known methods.

It will be thus seen that when calcium chlorid is added to the finely divided rock material a double decomposition ensues, but substantially the same character of decomposition also follows if other reagents than calcium chlorid are employed. For example, when ferrous sulfate $FeSO_4$ is employed, the reactions that take place may be indicated by the following equation:—

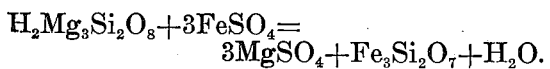

Should ferric sulfate $Fe_2(SO_4)_3$ be employed the following equation would represent the process:—

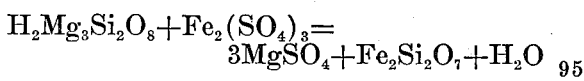

In both cases however, an excess of the reagent above that required from theoretical considerations must be employed in order to attain satisfactory results. I find that from 10% to 20% excess is sufficient when the rock is ground to say 100 mesh.

It will be further observed that whether ferrous or ferric sulfate is employed the resulting product is magnesium sulfate $MgSO_4$ which can be readily recovered in the filtrate as in the case of the production of magnesium chlorid.

When talc is used similar reactions take place which it is not deemed necessary to indicate, and of course, other magnesium bearing rocks may be substituted for the serpentine and talc here specifically mentioned.

In all cases it will be observed that a reagent or a compound containing an acid radical capable of forming a water soluble compound with magnesium oxid is necessary in order to carry out this process.

It is obvious that those skilled in the art may vary the details of the process without departing from the spirit of the invention and therefore it is not wished to limit the process to the above disclosure except as may be required by the claims.

What is claimed is:—

1. The process of extracting magnesium compounds from magnesium bearing rocks, which consists in finely dividing said rocks; mixing with the finely divided rock material a water solution containing more than 15% of calcium chlorid in excess of theoretical requirements; and digesting said rock material and chlorid under a pressure higher than that of the atmosphere, substantially as described.

2. The process of extracting magnesium compounds from magnesium bearing rocks, which consists in finely dividing said rocks; mixing with the finely divided rock material a water solution containing an excess of more than 10% of a reagent having an acid radical capable of forming a water soluble compound with the magnesium radical; digesting and heating said rock material and reagent under a pressure higher than that of the atmosphere until the desired magnesium compound is formed; and suitably recovering from the residue the said desired compound, substantially as described.

3. The process of extracting magnesium chlorid from a magnesium rock silicate which consists in finely dividing said silicate; adding to the finely divided silicate material thus formed a water solution containing calcium chlorid in excess; and digesting and heating the mixture under a pressure of more than three atmospheres until the desired magnesium chlorid is formed, substantially as described.

4. The process of extracting magnesium chlorid from a magnesium rock silicate which consists in finely dividing said silicate; adding to the finely divided silicate material thus formed a water solution containing an excess of more than 15% of calcium chlorid; digesting and heating the mixture under a pressure of more than four atmospheres until the desired magnesium chlorid is formed; and suitably separating said magnesium chlorid from the residue, substantially as described.

In testimony whereof I affix my signature, in presence of a witness.

SAMUEL PEACOCK.

Witness:
   T. N. WITHERSPOON.